United States Patent
Jäckel et al.

(10) Patent No.: US 6,402,622 B1
(45) Date of Patent: Jun. 11, 2002

(54) TORSIONAL VIBRATION DAMPER IN A MOTOR VEHICLE POWER TRAIN

(75) Inventors: Johann Jäckel, Baden-Baden; Ad Kooy, Lauf, both of (DE)

(73) Assignee: LuK Lamellen und Kupplungsbau GmbH, Buhl/Baden (DE)

(*) Notice: Subject to any disclaimer, the term of this patent is extended or adjusted under 35 U.S.C. 154(b) by 0 days.

(21) Appl. No.: 09/443,192

(22) Filed: Nov. 17, 1999

Related U.S. Application Data (63) Continuation of application No. PCT/DE99/00898, filed on Mar. 23, 1999, now abandoned.

(30) Foreign Application Priority Data

Mar. 25, 1998 (DE) .......................................... 198 13 260
Sep. 22, 1998 (DE) .......................................... 198 43 298

(51) Int. Cl.$^7$ ................................................. F16D 3/14
(52) U.S. Cl. ..................................... 464/66; 192/214.1
(58) Field of Search ............................. 464/66, 67, 81; 192/212, 214, 214.1; 267/167, 180; 74/574

(56) References Cited

U.S. PATENT DOCUMENTS

| | | | |
|---|---|---|---|
| 1,790,516 A | * 1/1931 | Williams | 74/574 X |
| 1,840,656 A | * 1/1932 | Breer | 74/574 |
| 2,380,218 A | * 7/1945 | Claud-Mantle | 267/180 X |
| 2,586,646 A | * 2/1952 | Graham | 267/180 X |
| 3,685,722 A | * 8/1972 | Nichols, Jr. | 464/66 X |
| 4,729,465 A | * 3/1988 | Reik | 192/214.1 X |
| 5,863,253 A | * 1/1999 | Rohs et al. | 464/66 |

FOREIGN PATENT DOCUMENTS

| | | | | |
|---|---|---|---|---|
| DE | 280120 | * | 11/1914 | 464/67 |
| EP | 423-089 | * | 4/1991 | 464/67 |
| GB | 305304 | * | 2/1929 | 464/66 |
| SU | 1388-612 | * | 4/1988 | 267/180 |

* cited by examiner

Primary Examiner—Lynne H. Browne
Assistant Examiner—Greg Binda
(74) Attorney, Agent, or Firm—Darby & Darby (57) ABSTRACT

A torsional vibration damper for use in a motor vehicle power train has an input disc part connected to the vehicle engine and an output disc part to the downstream side of the power train. The disc parts are rotatable relative to each other against the action of an energy accumulator such as a coiled compression spring. The energy accumulator is seated in a suspension device that is divided into two socket parts. The socket parts are rotatable in relation to each other as well as in relation to the input and output disc parts. The input and output disc parts have biasing means engaging the socket parts so that, for a first sense of relative rotation between the input and output disc parts, the biasing means of the input disc part engage the first socket part and the biasing means of the output disc part engage the second socket part while, for a second, opposite sense of relative rotation, the biasing means of the input disc part engage the second socket part and the biasing means of the output disc part engage the first socket part, with the result that for either sense of relative rotation between the input and output disc parts, the energy accumulator is always force-biased in a compressive sense between the socket parts.

38 Claims, 6 Drawing Sheets

TORSIONAL VIBRATION DAMPER IN A MOTOR VEHICLE POWER TRAIN

This is a continuation of International Application No. PCT/DE99/00898, filed Mar. 23, 1999 now abandoned.

BACKGROUND OF THE INVENTION

The invention relates to a torsional vibration damper for taking up and/or compensating for rotary shocks, especially torque fluctuations of an internal combustion engine, with at last two disc parts which are rotatable relative to each other against the action of at least one energy accumulator which is provided between the disc parts in the force transmitting path and acts at least in the circumferential direction.

Torsional vibration dampers of such kind are known and in accordance with one embodiment, can constitute divided flywheels with flywheel masses. Torsional vibration dampers of such kind normally comprise circumferentially spaced apart energy accumulators which are biased on the circumferential side through recesses or shaped areas in the two flywheel masses. By way of example, reference is made to FR PS 2 166 604. Such torsional vibration dampers are subject to pronounced wear upon the biasing devices and energy accumulators as a result of their design. Solutions have therefore been proposed such as, for example, in DE PS 35 15 928 using lubricant-filled energy accumulator chambers which are sealed on the outside but these are correspondingly expensive to construct and therefore involve increased manufacturing costs.

OBJECT OF THE INVENTION

Accordingly, it is an object of the invention to provide a torsional vibration damper of the kind described which is less susceptible to wear and thus exhibits a greater durability whilst at the same time optimizes production costs. Furthermore, a simple mounting of the energy accumulators in the flywheel masses is also to be made possible. The energy accumulators should be supported as uniformly as possible at their ends in the circumferential direction and secured against escape radially outwards in the event of high centrifugal forces.

SUMMARY OF THE INVENTION

This is achieved according to the invention by the provision of a torsional vibration damper which comprises between at least two relatively rotatable disc parts at least one energy accumulator in the force transmitting path, which is active at least in the circumferential direction, and which is housed in a suspension device divided into two socket parts, the two socket parts being adapted to be biased in dependence on the circumferential direction by biasing means of the two disc parts to compress at least one energy accumulator and the biasing devices each bias one socket part alternately in dependence on the direction of rotation.

Torsional vibration dampers of such kind can be equipped for example with simple disc parts and can be used as friction lining supports in a clutch, for example, in the power train between the drive unit and the gearbox. Furthermore, the disc parts can be provided with flywheel masses or can consist of flywheel mass elements whereby they can be used in the power train as a divided flywheel with two flywheel masses which can be rotated relative to each other against the action of the at least one energy accumulator.

The biasing means can advantageously be shaped as a bolt or stud fixed axially on the disc parts, and the disc parts can constitute circular discs and can be provided with flywheel masses and one disc part can be connected to the drive shaft of an internal combustion engine and the second disc part can be connected to the input shaft of a gearbox through a friction clutch or the like fixed on the second disc part.

The suspension or receiving device, which can also be used in conventional damping devices without flywheel masses, consists for suspension of the at least one energy accumulator, wherein four to eight, and preferably six, helical compression springs spread out over the circumference can be particularly advantageous, of two socket parts which for reasons of cost efficiency and easier mounting can be identical and face one another mirror symmetrically and can be fitted in each other turned by the angle of one energy accumulator socket whereby in the event of predetermined stressing they can transmit a basic friction torque in the torsion vibration damper at the points where they contact each other. Furthermore, stops or sockets for the energy accumulator corresponding to the relevant number of energy accumulators can be provided on each socket part and extend over the entire axial width of the suspension device and therefore engage in the relevant other socket part so that for each energy accumulator one stop or one biasing device can be formed at one circumferential end by the first socket part and thus by the first disc part and at the other end by the second socket part and thus by the second disc part. The large surface socket can advantageously be 70% and more of the area of the energy accumulator cross-sections and, therefore, the ends of the energy accumulators need not be ground as exactly flat as in conventional dampers or indeed grinding can be omitted completely. The inclination of a socket in the circumferential direction is preferably selected in such a way that it conforms to the inclination of the ends of the energy accumulators and thus the contact faces of the energy accumulator ends can be further optimized.

According to the invention, the two preferably identical socket parts are formed in such a way that they each have a ring-shaped carrier mounted at the outer circumference and a ring shaped support mounted on the inner circumference which both lie in one plane and have approximately half the axial width of the suspension device whereby on one axial side the sockets provided radially between the support rings protrude for the energy accumulators which when the two socket parts are assembled engage in each other. The outer support can have approximately the cross-sectional shape of a quarter circle or can be chamfered so that the suspension device overall can have approximately a semi circular profiled section or a profiled section on the outer circumference which is chamfered at the outer edges.

It can further be advantageous to limit the extent of angular movement of the two socket parts, that is the angular movement of the socket parts relative to the biasing means of the disc parts. To this end, in addition to the blocking of the energy accumulators—when using coil compression springs through the windings stopping against each other—stops can be provided on the sockets for the energy accumulators inside the outer support and these project circumferentially into the pockets in which the energy accumulators are housed whereby of each socket of the energy accumulator one stop projects into the pocket so that by selecting the length of the two stops projecting into the pockets it is possible to fix the turning angle in the circumferential direction. A turning angle is preferably selected which is smaller than that provided by the blocking of the energy accumulators.

The stops which are provided to limit the extent of angular movement advantageously serve at the same time as radial supports for the energy accumulators radially outwards, especially in the case of high centrifugal force action, and to this end can have the cross-section of a ring segment. A profiled section matching the cross-section of the energy accumulators can be formed as a support for the energy accumulators on the inside in the area of the pockets for holding the energy accumulators on the inner support whereby the overall profiled section is produced by fitting together the two supports of the socket parts. The inner circumference of the two inner supports can be designed flat so that the hanging device where required can be centered and/or mounted thereon.

When using coil compression springs as energy accumulators these can be wound according to the invention so that they have windings with different diameters. Coil compression springs can advantageously be used which starting and ending with a winding of larger diameter have alternately large and small windings. Furthermore it can be provided that the center point axis of the windings with large and small diameter is not the same—thus a concentric arrangement of the windings along the axial extension—but that the center point axis of the windings with smaller diameter is displaced parallel to the center point axis of the large windings so that on one side of the winding circumference the windings of small diameter can be inserted in the inner circumference of the windings of large diameter and on the other side can be mounted at the same radial height. An installation position of the coil springs can be advantageous with the insertable windings of small diameter on the outer circumference of the suspension device so that the radially larger compression path of the springs can be compensated for and the spring capacity can be optimized whereby the springs can be suspended in the corresponding sockets so that rotation is prevented. Springs of this kind can advantageously be used also in many other cases, for example, in disengagement devices as over dead center springs, compensation springs and/or return springs and the like.

Further sockets or openings can be provided at the sockets for the energy accumulators facing away from the socket faces for engagement of the biasing means of the flywheel masses. The biasing means of the disc parts advantageously consist of bolts engaging axially in a socket part for which half-shell shaped openings are impressed on the side of the energy accumulator sockets opposite the receiving faces for the energy accumulators and these openings form with the second socket part an approximately circular opening in which an axially aligned biasing means—here preferably bolts—of each disc part can enter without contacting one another. Therefore, during rotation of the two disc parts relative to each other, the two socket parts can be turned in the relevant direction of rotation of the disc parts and the energy accumulators can thereby be compressed about their neutral position by each disc part. This can lead to a more even biasing of the energy accumulators and thus to reduced wear, especially in the case of high speeds with corresponding centrifugal force action and with energy accumulators which are stretched in the circumferential direction accordingly.

In order to shield the suspension device from the action of the centrifugal force and/or to protect the suspension device from thermal stressing by the disc parts—particularly in the case of disc parts having flywheel masses of a divided flywheel which is connected to the output side on account of the ensuing friction heat through the clutch which can be attached here—the suspension device can be provided on its outer circumference with a corresponding reinforcement made for example of a heat-reflecting and/or tension-resistant material such as metal whereby this reinforcement can follow the surface profile of the outer support and can surround same over the entire circumference in cross-section approximately semi-circularly or chamfered over the outer edges or a reinforcement can be provided for each support, by way of example, by means of two circumferentially complete wire rings on the outer circumference of each support whereby a circumferential groove can be formed in the supports to guard against axial slipping of the rings.

Advantageously the suspension device is made from a plastic material whereby injection moulding processes are preferably used although a design of metal can also be advantageous.

The suspension device can be arranged for an ideal formation of the energy accumulators over the entire radius of the torsional vibration damper whereby advantages are gained when mounted in the area radially outside of the fastening screws of the first disc part on the drive shaft of the internal combustion engine, especially directly at the circumference of this screw circle.

The torsional vibration damper according to the invention can be fitted with a friction generating device acting in the range of the angular displacement between the two disc parts and which can include a base friction and/or a selected variable friction whereby the selected variable friction can be controlled by means of a friction control disc which can engage in a disc part or in a component part fixedly connected thereto and acts on a friction disc which is fixed securely on the other disc part or a component part connected to same whereby an intended turning play between the friction control disc and the disc part can cause a delayed friction. In this way a friction generating device can be designed so that the friction control disc engages by axially protruding teeth, preferably formed on its outer circumference, in recesses of one of the two disc parts, preferably in the force applying component—by way of example in the divided flywheel connected to the drive shaft—whereby the friction generating device can be mounted radially outside or radially inside the suspension device. The friction disc is advantageously inserted or snap-fitted by axially protruding studs rotationally secured on the other disc part preferably the one connected to the gearbox side or emitting the force. It can be further advantageous to make the friction force dependent on the force being applied to the energy accumulator, thus in dependence on the spring force in the case of coil compression springs. To this end, one side of the torsional vibration damper, for example, the side of the first flywheel mass can be fitted with conical biasing means which are placed against complementary conical sockets of the socket part and thus form a ramp. The friction disc is mounted axially between the flywheel mass and the energy accumulator sockets and can be placed in the neutral position of the energy accumulators frictionfree or with a predetermined basic friction. If relative rotation takes place between the flywheel masses through biasing of the energy accumulators, then the socket part with the socket of the energy accumulators is moved along the ramp in dependence on the force being applied to the energy accumulators axially in the direction of the friction disc and thus the friction force is correspondingly increased.

A further inventive concept contemplates the provision of a torsional vibration damper whose biasing means are formed directly on, for example integral with, a disc part or a component part connected therewith. For example, it can be advantageous to design the biasing means of a disc part mounted on the gearbox side with a flywheel mass of axially aligned extension arms of the clutch cover fixed on the disc part or on the flywheel mass and/or to provide the biasing means on the drive side as radially aligned stops or a window recessed in the disc part according to the spatial extension of the energy accumulator.

Furthermore it can be advantageous to use a slip clutch which can have preferably a restricted turning angle. The slip clutch can be provided between a disc part on the gearbox side or drive side, preferably connected on the gearbox side, and the associated flywheel mass whereby the turning angle is restricted by recesses in the flywheel mass forming stops, in which corresponding extension arms of the disc part can be moved between two stops against the action of the friction force of the slip clutch. The friction devices establishing the friction force of the slip clutch can be mounted on the side of the disc part or flywheel mass facing the gearbox and/or internal combustion engine, for example, radially inside the friction face for the shift clutch and/or at the rear side of the flywheel mass formed as a contact pressure plate.

A further inventive concept involves the provision of an arrangement of several but at least two suspension devices radially spaced from each other so that two independent damping devices are formed which can be combined with each other and which can be formed in two stages or are designed for the purpose of increasing the torque which is to be damped and/or transmitted. Furthermore, it is conceivable that a suspension device be combined with a damping device fitted radially on the outside, for example in series connection, which has as energy accumulators in the form of curved springs and which can be filled with lubricant. Furthermore, it can be particularly advantageous for producing a particularly long-running torsional vibration damper to also grease or oil the hanging device or to operate same confined in a chamber in lubricating medium such as grease or oil or the like.

BRIEF DESCRIPTION OF THE DRAWINGS

The invention will be explained in further detail with reference to the embodiments shown in FIGS. 1 to 11. There are shown in.

DETAILED DESCRIPTION OF PREFERRED EMBODIMENTS

Figure 1:
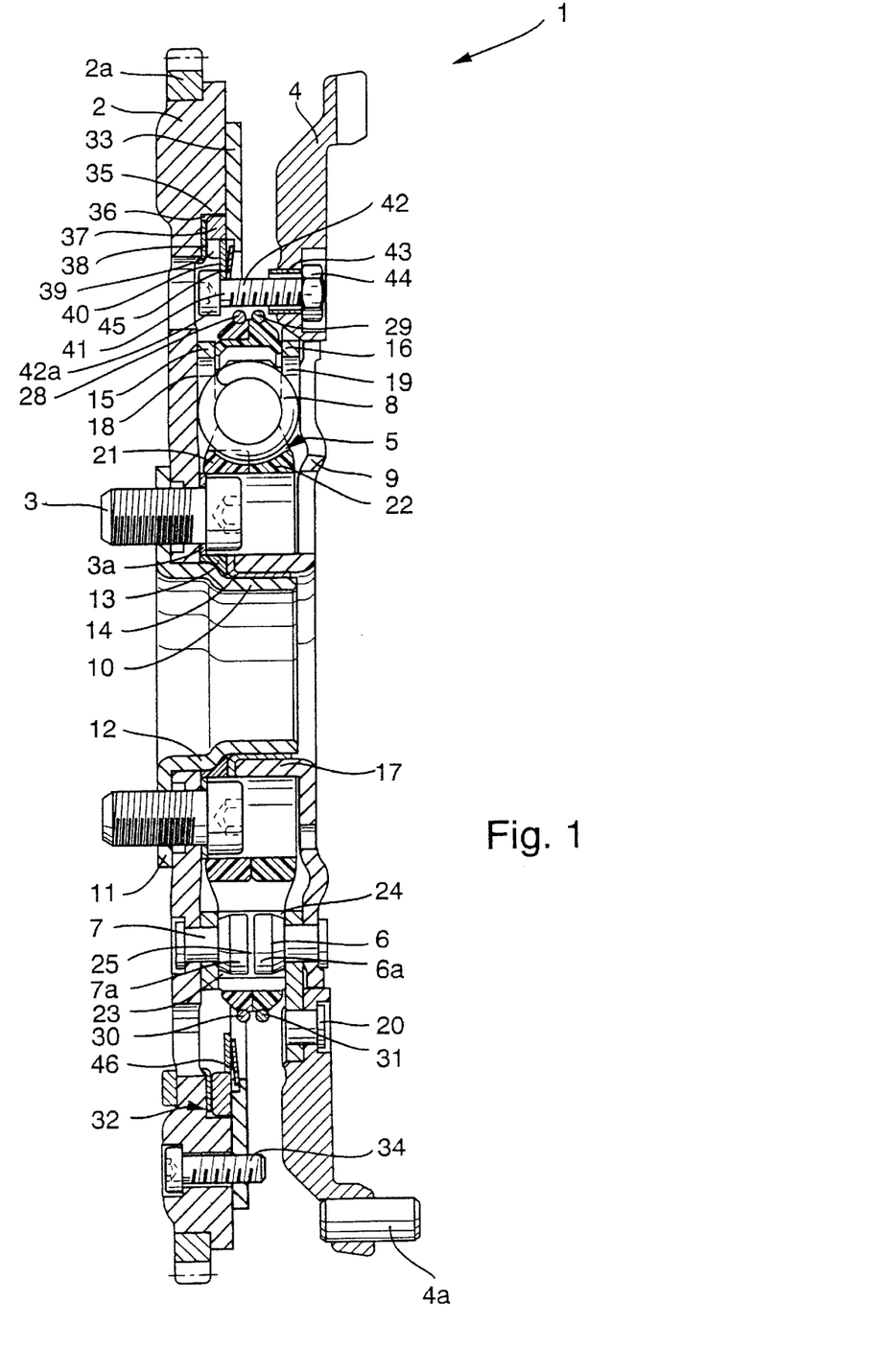
FIG. 1 a cross-section through a torsional vibration damper according to the invention.

FIG. 1 shows a torsional vibration damper 1 as a divided flywheel with a first disc part 2 serving as a flywheel mass and having a starting gear ring 2a which is attached radially on the outside and is fixed on the drive side by circumferentially distributed screws 3 and reinforcement or washer discs 3a on a drive shaft (not shown) of an internal combustion engine, and a second disc part 9 connected to the gearbox side through a flywheel mass 4 on which a clutch (not shown) can be fitted by means of a centering or locator bolt, as well as the suspension device 5 which is mounted in the force path between same and which is acted upon by the axially aligned bolts 6,7 which are connected to the disc parts 2, 9, with preferably six coil springs 8 which are spread out over the circumference and oppose rotation of the two disc parts 2,9.

The disc part 2 is centered on a bearing bush 10 which is likewise non-rotatably connected to the drive shaft by means of a radially outwardly oriented flange part 11 and the screws 3. A rotatably mounted stop ring 13 of L-shaped cross-section is drawn onto a shoulder 12 of the bearing bush 10 which is formed radially on the inside and spaced axially from the flange part 11 whereby the disc part 9 is placed against the stop ring by means of a tubular flange part 17 formed on the inner circumference axially in the direction of the disc part 2 with the interposition of a sliding bush 14. Six rivets or bolts 6,7 circumferentially spaced, preferably on each disc part are riveted as biasing means or sockets for the suspension device 5 on the two disc parts 2, 9 with the interposition of the ring disc like intermediate parts 15, 16 wherein these have windows 18,19 shaped and dimensioned to receive the energy accumulators 8, and the intermediate part 16 attached to the disc part 9 holds the flywheel disc 4 radially outwards by means of further rivets 20 spread out over the circumference, whereby other connecting means such as for example screw bolts and the like can also be used. The bolts 6, 7 extend axially so far that they do not contact one another and only bias the two socket parts 21,22. The heads 6a, 7a of the rivets 6, 7 are dimensioned with regard to their diameter so that a play-free engagement or, for producing an undamped small angular area about the neutral position of the compression of the energy accumulator 8, an engagement with play in the openings 25 of the suspension device 5 is ensured whereby the round openings 25 are each formed by a biasing device 23 of the one socket part 21 formed as a half dish and stressing the entire width of the suspension device 5, and a circumferentially following biasing device 24 of the socket part 22 which mirrors the biasing device 23. With relative rotation of the two disc parts 2, 9 against each other the annulus of rivets thereby entrains with the bolt 7 the socket parts 21 and biases the energy accumulator 8 by means of the biasing devices 23 for example in the positive turning direction and the bolts 6 of the disc part 9 remain stationary or bias the socket part 22 by means of the biasing means 24 against the action of the energy accumulator 8 in the negative sense and vice versa whereby the two half shells 23, 24 are separated from each other to an extent corresponding to the turning angle. The biasing devices 23, 24 have for holding the energy accumulators 8 in the circumferential direction, opposite the half shells forming the openings 25, contact bearing faces 26, 27 complementary to the ends of the energy accumulators— seen more clearly in FIG. 2. Circumferentially continuous wire rings 28, 29 are provided at the outer circumferences of the socket parts 21, 22 for reinforcing these in the event of high centrifugal forces and these wire rings are inserted in circumferential grooves 30,31 formed in the socket parts 21, 22.

A base amount of friction of the torsional vibration damper 1 is achieved through the axial biasing of the two socket parts 21, 22 whereby friction torque is built up at the contact points thereof. In addition, an actual friction device 32 with a friction disc 37 is mounted radially outside of the suspension device 5. The friction disc 37 is advantageously inserted (as shown in FIG. 1) or, as an alternative (not shown), snap-fitted by axially protruding studs rotationally secured on the disc part 9. A stop plate 33 is secured in the area of its outer circumference by means of circumferentially distributed screws 34 on an axial circumferential projection 35 of the disc part 2 on the drive side, whereby a radially inwardly open groove 36 is formed between the disc part 2 and the stop plate 33. The friction disc 37 is placed in this groove and biased by means of the diaphragm spring 38 which is placed against the disc part 2. The friction control disc 40 has an external tooth profile engaged in an internal tooth profile with internal teeth 39 formed on the inner circumference of the friction disc 37. The friction control disc 40 further has internal teeth 41 making a positive locking connection with screws 42 which are distributed over the circumference and are aligned axially in the direction of the disc part 2 and which are fixed by means of threaded bushes 43 and nuts 44 in the flywheel mass 4 on the output side whereby the friction control disc 40 is pushed against the heads 42a of the screws 42 by means of the plate spring 45 which is inserted in a groove 46 between the friction disc and stop disc 33. To delay the onset of friction, an angular play can be provided either between the friction disc 37 and friction control disc 40 or between the internal teeth 41 of the friction control disc 40 and the screws 42. As an alternative to the foregoing illustrated embodiment of FIG. 1, the friction device 32 can be designed so that the friction control disc 40 engages by axially protruding teeth, preferably formed on its outer circumference, in recesses of one of the two disc parts, preferably in the force applying component—by way of example in the divided flywheel connected to the drive shaft—whereby the friction generating device 32 can be mounted radially outside or radially inside the suspension device. It can be further advantageous to make the friction force dependent on the force being applied to the energy accumulators 8, thus in dependence on the spring force in the instance where the energy accumulators 8 are coil compression springs.

Figure 2:
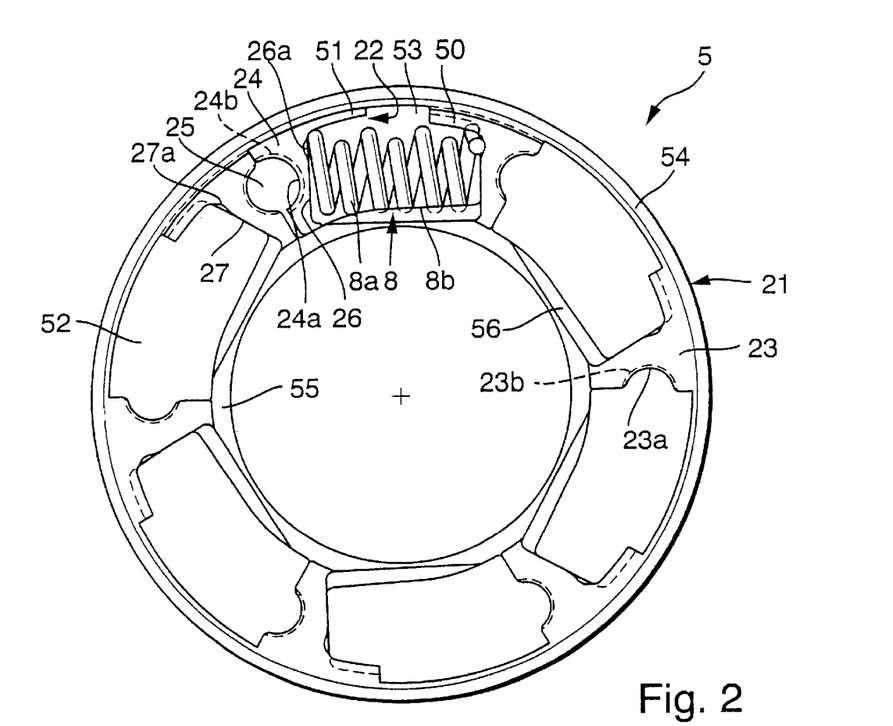
FIG. 2 an elevational view of a socket part of a suspension device according to the invention.

FIG. 2 shows a suspension device 5 according to the invention having the socket parts 21, 22 whereby the socket part 22 for clarity is only shown in section. Both socket parts 21, 22 are identical and are fitted into each other whereby the openings 25 are formed for biasing through the bolts (not shown) of the disc parts. Each of the socket parts 21, 22 forms in the number of the energy accumulators 8 which can be stored—in certain cases spaces can be left unoccupied for the energy accumulators—a biasing device 23, 24 which has half shell shaped openings 23a, 24a which in the neutral position form the openings 25 and have shaped portions 23b, 24b complementary to the bolts, and on the opposite side in the circumferential direction have contact bearing faces 26, 27 for the energy accumulators 8 which correspond to the width of the entire suspension device 5 and thus project axially into each other socket part 21 or 22 whereby for the relevant energy accumulator 8 a contact bearing face 26,27 is formed corresponding to its cross-section whereby a contact bearing face 26 and a contact bearing face 27 biases each energy accumulator 8. The socket parts 21, 22 are rotatable relative to each other against the action of the energy accumulators 8. The maximum turning angle is determined by stops 50, 51 projecting circumferentially into the pockets 52, 53 for holding the energy accumulators whereby the stops block the turning in the event of the maximum predetermined turning angle and bypass the damping device. The stops 50, 51 conform in cross-section to the contour of the energy accumulator 8 so that these are supported radially outwards in the event of high centrifugal forces. The biasing devices 23, 24 of the socket parts 21, 22 are housed radially outwards by an outer support 54 and radially inwards by an inner support 55 which are mounted in a common plane. The outer support 54 has approximately the cross-section of a quarter circle so that when the socket parts 21, 22 are fitted together roughly the cross-section of a semicircle is formed with radially outwardly guided circular arc or profiled section which is chamfered at the outer edges. The inner support 55 is formed on its inner circumference as a flat cylinder face so that the suspension device 5 can thereby be housed and centered. The outer circumference of the inner support 55 is provided in the pockets 52 with conical chamfers 56 which, when the socket parts 21, 22 are fitted together, are approximately barrel-shaped and in which the energy accumulators 8 can be fitted whereby these are supported radially.

The receiving faces 26, 27 of the socket parts 21, 22 can advantageously be 70% or more of the area of the energy accumulator cross sections and, therefore, the ends of the energy accumulators 8 need not be ground as exactly flat as in conventional dampers or indeed grinding can be omitted completely. The inclination of the receiving faces 26, 27 relative to the circumferential direction is preferably selected in such a way that it conforms to the inclination of the ends of the energy accumulators 8.

In the illustrated embodiment, the energy accumulator 8 is formed as a coil compression spring with windings 8a, 8b of smaller and larger diameter whereby, seen in the installation position, the small windings 8a can be inserted relative to the socket parts 21, 22 radially outwards with compression into the large windings 8b and radially inwards—if the stops do not lock this turning angle—pass into a block. The advantage of this spring assembly is the greater compression length since the compression path at the outer circumference is greater than at the inner circumference. In order to block the rotation of the springs 8 along their longitudinal axes the spring ends are inserted in the indentations 26a, 27a of the contact bearing faces 26,26.

Advantageously the suspension device 5 is made from a plastic material whereby injection moulding processes are preferably used although a design of metal can also be advantageous.

Figure 3:
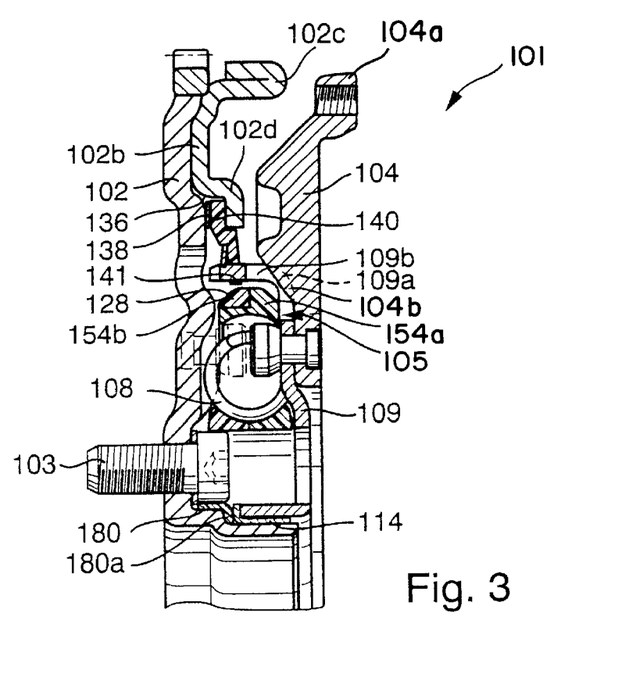
FIGS. 3 to 10 sections of further design samples of torsional vibration dampers according to the invention and FIG. 11 a detail of a suspension device with friction dependent on spring force.

FIG. 3 shows a partial view of a torsional vibration damper 101 as a divided flywheel which is designed basically in the same way as the torsional vibration damper 1 in FIG. 1 but with the following modified design features:

The disc part 102 supports as the flywheel mass on the drive side a ring-disc like sheet metal part 102b fixed radially outwards by means of circumferentially distributed screws, rivets or the like and shaped round into a bead 102c on its outer circumference in the axial direction and radially outwards approximately round 180 degs. in the direction of the starting gear ring 102a which is attached radially outside on the disc part 102 in order to increase the moment of inertia. The sheet metal part 102b forms on the inner circumference with the disc part 102 by means of an axially impressed shoulder 102d a circumferential groove 136 in the friction control disc 140 and a plate spring 138 which is supported between the disc part 102 and the friction control disc 140 whereby friction torque is produced when the friction control disc 140 turns relative to the sheet metal part 102b. To this end, the friction control disc 140 is connected by means of teeth 141 which can provide a certain amount of play to produce a delayed friction, with the disc part 109 which has on the outer circumference tongues 109b shaped round axially accordingly in the direction of the disc part 102, to the disc part 102 whereby the proposed friction torque is established during corresponding relative rotation of the disc parts 102,109. The circumferentially distributed tongues 109b are inserted at their bending radius 109a into corresponding recesses 104b of the flywheel mass 104 on the output side connected to the disc part 109 and having means 104a for holding a clutch (not shown).

The reinforcement 128 is in this embodiment designed so that it axially encloses both support parts 154a, 154b and is drawn radially inwards at the flanks. The shape of the reinforcement is designed so that the two support parts can turn circumferentially relative to each other without problem whereby friction of the support parts 154a, 154b during relative rotation can be set on the reinforcement whereby a hysteresis provided in addition to the friction device can be effected.

The journalling of the disc part 109 is effected directly through the interposition of an anti-friction bearing bush 114 on the disc part 102 and the two disc parts are formed round axially facing one another. For axially spacing out the two disc parts 102, 109 the reinforcement disc 180 which is screwed to the drive shaft by means of the screws 103 which also undertake the task of fixing the disc part 102 on the drive shaft is shaped round correspondingly axially to form a radially inwardly directed extension 180a.

The suspension device 105 which serves as a holding device for the energy accumulators 108 has at its outer circumference a circumferential reinforcement 128 which is adapted to the shape of the two outer supports 154a, 154b and engages over same and which counteracts the centrifugal forces at high speeds and/or can serve as thermal protection whereby the material must be able to withstand tensile stresses and/or to be thermally stressed according to these conditions and/or have heat-radiating properties. Furthermore the reinforcement 128 can be mounted on the outside support 154a, 154b by exerting initial axial stressing so that the friction force can thereby be set between the two and a basic friction can be established for the torsion vibration damper 101.

Figure 4:
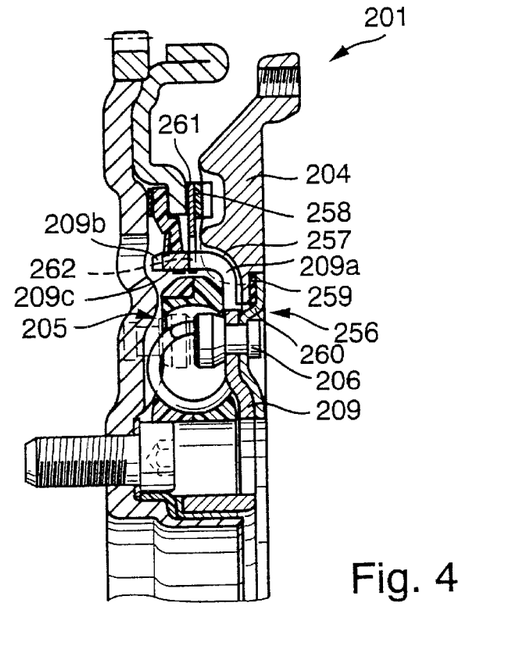

FIG. 4 shows a divided flywheel 201 similar to the embodiment 101 of FIG. 3 and fitted in addition with a circumferentially restricted slip clutch 256. The flywheel mass 204 on the output side is rotatable circumferentially relative to the disc part 209 on the output side against the friction torque caused by the friction discs 258, 259 relatively in the area of the turning angle defined by the stops 257 in which the bending radii 209a of the side disc 109 are guided. The flywheel mass 204 is to this end housed between two ring disc like metal plates 260, 261 and supported against the friction discs 258, 259 attached to the plates 260, 261 whereby the plate 260 is non-rotatably connected to the disc part 209 by means of the bolts 206 biasing the suspension device 205 and the plate 261 is suspended by means of teeth 262 which can be provided with play to form a two-stage slip clutch 256, in the tongues 209b which have stops 209c for the axial support of the metal plate 261.

Figure 5:
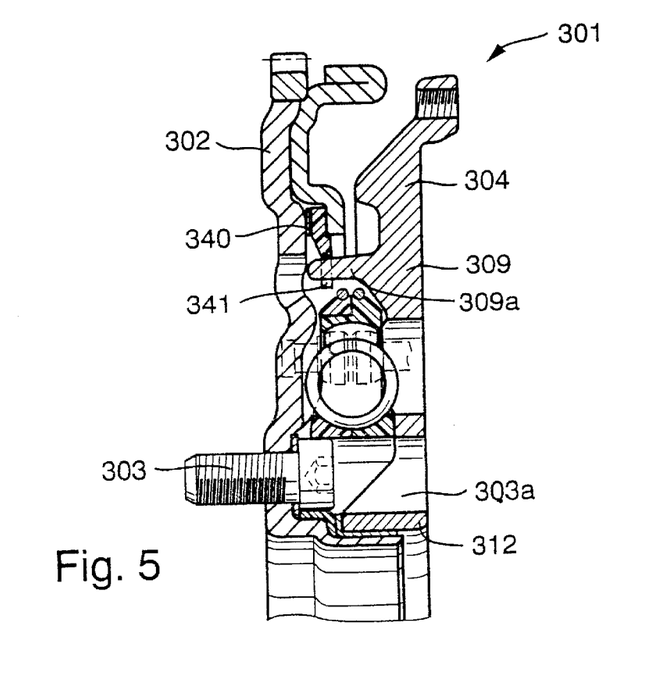

The disc part 309 of the embodiment of a divided flywheel 301 shown in FIG. 5 is formed as a complete casting so that especially the radially outer part is inserted as flywheel mass 304 and the friction control disc 340 by means of the inner teeth 341 is inserted in circumferentially spaced apart extension arms 309a aligned axially in the direction of the disc part 302.

The disc part 309 is journalled as in the previous embodiments in the disc part 302 and it is axially expanded in the area of the bearing socket 312 and circumferentially spaced assembly openings 303a are provided for fixing the flywheel 301 on the drive shaft by means of the screws 303.

Figure 6:
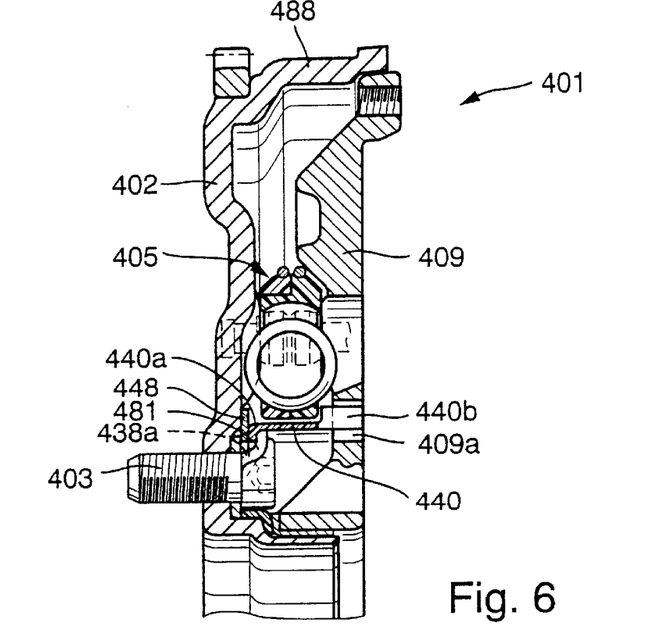

In the embodiment of a divided flywheel 401 shown in FIG. 6 the disc part 402 is reshaped axially to form a flywheel mass 488 in the direction of the disc part 409 which in turn is formed as a casting and is extended over its radial outer circumference. The friction device 432 is formed by a friction control disc 440 which fits radially close outside the screws 403 for fixing the disc part 402 and inside the suspension device 405 and by the plate spring 438. The friction control disc 440 is housed, with a radially inwardly aligned attachment 440a, in radially aligned tongues 481 of the reinforcement flange 480 and is biased by a diaphragm spring 438 which is inserted between the disc part 402 and friction control disc and engages by inner teeth 438a likewise in the tongues 481. The friction control disc 440 is connected in the disc part 409 by spur gearing 440b which engages with keyed connection in suitably recessed openings 409a of the disc part 409. The teeth can be provided with play between the parts 481, 438a and/or 440b, 409a to produce delayed friction.

Figure 7:
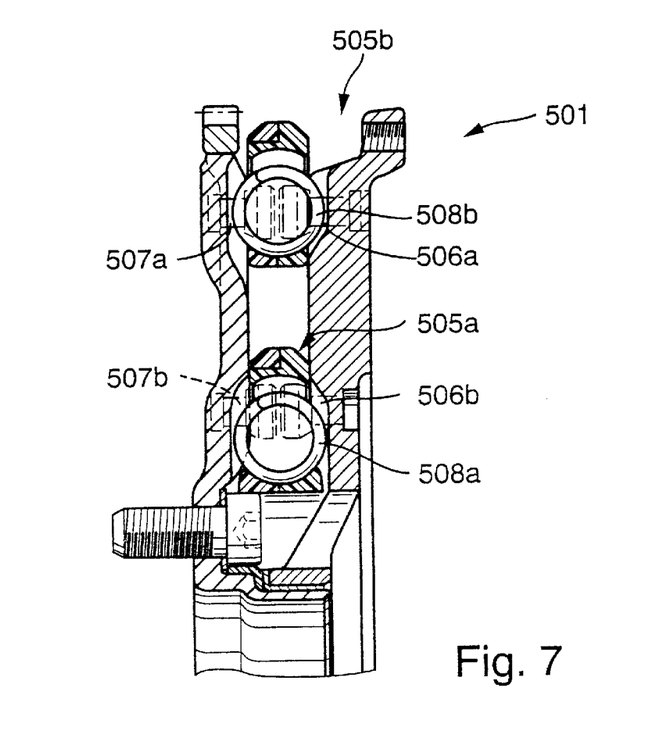

A torsional vibration damper, especially in the form of a divided flywheel 501 can—as shown in FIG. 7—have two suspension devices 505a, 505b—as described in the previous embodiments—radially spaced from each other whereby a torque intensification can be achieved by increasing the number of energy accumulators 508a, 508b and/or a two-stage damping device can be created. When creating a two-stage damping device, the biasing devices—which cannot be seen but are denoted in FIG. 2 by reference characters 23, 24—or the energy accumulator sockets (26, 27 in FIG. 2) of the radially inner or radially outer suspension device 505a, 505b can be provided with circumferential play so that the biasing of the corresponding energy accumulators 508a, 508b only takes place in the event of greater angular displacement between the disc parts 502, 509. A restriction of the diameter of the bolts 506a, 507a or 506b, 507b is also possible to produce turning play.

Figure 8:
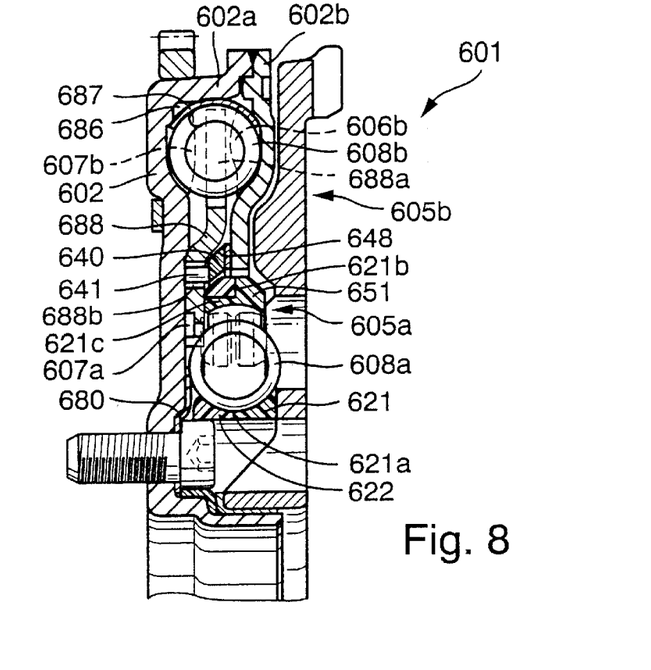

In the same way—as shown in FIG. 8—a divided flywheel 601 can be proposed which has as a first damping device a suspension device 605a with preferably six circumferentially spaced apart short coil compression springs 608a and a second damping device 605b with long arcuate springs 608b extending over a larger area on the outer circumference of the flywheel 601, as known per se from DE OS 37 21 711 for example and which are housed with the interposition of an anti-wear shell 687 provided on the outer circumference of the curved springs 608b, in a radially inwardly circumferentially open chamber 686 formed by the disc part 602 and a radially inwardly directed flange part 602b welded to an axially aligned connecting part 602a shaped round axially on the outer circumference of the disc part 602. The two damping devices 605a, 605b are thereby connected in series in a sense such that the one end of the curved springs 608b of the damping device 605b on the circumferential side, viewed from the drive side, is first biased in the circumferential direction by means of axially shaped biasing devices 606b and 607b provided in the disc part 602 and the flange part 602b, and the radially aligned flange 688 engaging through the radially inwardly open chamber 686 into the other end of the curve springs 608b on the circumferential side by means of biasing devices 688 formed as radially aligned extension arms directly biases with the bolts 607 on the drive side acting as biasing devices the damping device 605a which acts in a known way on the disc part 609. The flange part 688 and the disc part are rotatable relative to each other in the turning angle range of the damping devices 605a, 605b whereby this is restricted mechanically by the stops 651—see also FIG. 2, indices 50, 51—and the flange part 688 is centered on the reinforcement part 680. The friction disc 640 acting on the damping device 605b engages by teeth 641 with keyed engagement preferably with turning play in openings 688b in the flange part 688 provided therefor and is supported by means of the axial action of the plate spring 648 between the flange part 602b and the friction control disc 640 conically on the flange part 688. The basic friction which acts on the damping device 605a takes place through the contact points 621, 621b, 621c of the two socket parts 621, 622 wherein the friction can be selected in this area by the reinforcement 628.

Figure 9:
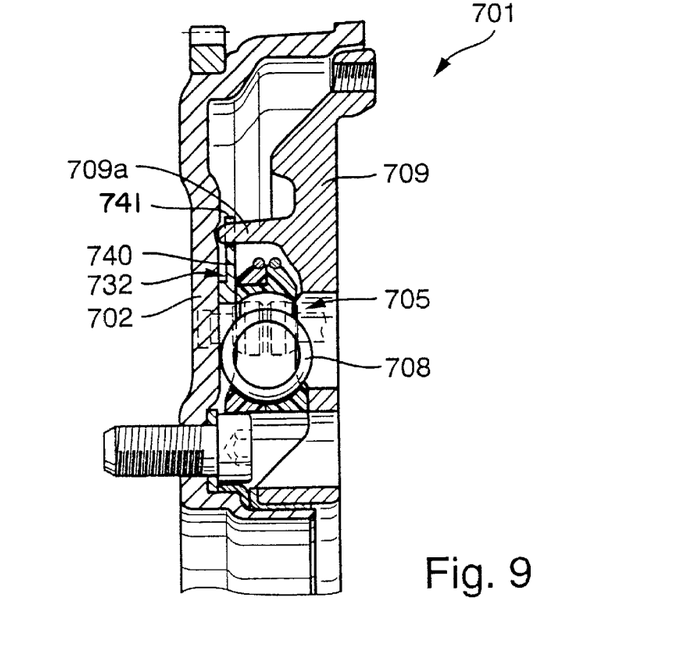

The friction control disc 740 of the friction device 732 of the divided flywheel 701 shown in FIG. 9 is inserted axially between the suspension device 705 and the disc part 702 and is connected positively by the outer teeth 741 with the axially aligned extension arms 709a whereby rotational play can be provided for producing delayed friction. The friction control disc 740 is entrained by the extension arms 709a so that with relative rotation between the disc parts 702, 709 a friction torque is produced between the friction control disc 740 and the disc part 702. This friction torque can be formed dependent on spring force, that is the friction torque increases with the force being applied to the coil springs 708.

Figure 11:
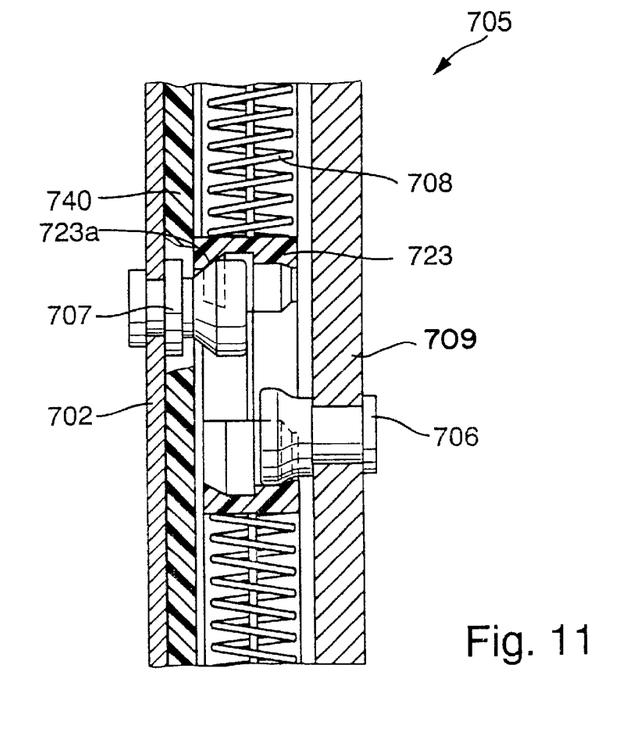

To this end, FIG. 11 shows in a sectional view the disc part 702 with the biasing bolt 707 fixed thereon which engages in the biasing device 723 on the drive side of the suspension device 705. The friction control disc 740 is mounted between the suspension device 705 and the disc part 702. During relative rotation between the two disc parts 702,709 the energy accumulators 708 are compressed whereby a counter force occurs in dependence on the spring force between the biasing devices 723 of the suspension device 705 and the biasing bolts 706,707. The contours of the biasing means 707, 723 are formed so that a ramp 723a is formed between same along which as a result of the spring force arising on the circumferential side an axial component of this force is introduced from the suspension device 705 into the friction control disc 740 whereby as the spring force increases so a higher contact pressure force acts on same and the friction torque is thereby increased.

Figure 10:
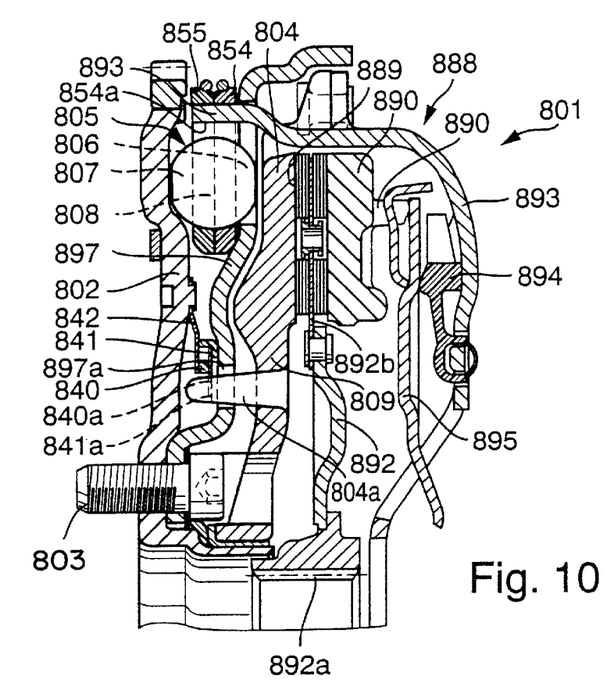

FIG. 10 shows a divided flywheel 801 with a clutch 888 which consists of the disc part 809 with the flywheel mass 804 forming the contact pressure plate 889, as well as the clutch disc 892 which is mounted axially between the contact pressure plate 889 and the pressure plate 890 and establishes by means of teeth 892a the connection with the gearbox (not shown) and supports radially outwards friction linings 892b, the clutch cover 893 on which the clutch plate spring 895 is mounted through the socket device 894 and which biases the pressure plate 890 through the cams 890a, whereby the clutch cover 893 is fixedly connected to the flywheel mass 804 on the outer circumference thereof.

The suspension device 805 which acts between the disc parts 802, 809 in the circumferential direction is mounted as the damping device axially between the disc part 802 and a further disc part 897 which is housed with the disc part 802 by means of screws 803 and centered thereon whereby the energy accumulators 808 are biased on the drive side by axially protruding radially aligned biasing devices 806, 807 formed from disc parts 802, 897, and on the output side by axially extended extension arms 893a of the clutch cover 893. The extension arms 893a thereby engage radially outside of the energy accumulators 808 in suitably provided openings 854a of the outer supports 854, 855 and during relative rotation between the disc parts 802, 809 entrain the suspension device 805 whereby the energy accumulators 808 are compressed since they are held firm by the biasing means 806, 807 on the drive side and vice versa. For small turning angles it is possible as in the other embodiments to provide a turning play—here through circumferentially expanded openings 854a—in the attachment of the suspension device 805 in which the damping device is inoperative.

The friction control disc 840 is in this embodiment provided radially inside the suspension device 805 with the disc parts 802, 897 and is controlled on the output side by means of cams 804a provided axially in the direction of the drive side on the disc part 809 and which are guided through the entire turning play in circumferentially recessed openings 897a. The friction control disc 840 and the plate spring 841 are housed on these cams 804a by means of the inner teeth 840a, 841a whereby the friction control device 840 is supported by means of the diaphragm spring 841 on a stop ring 842 which is riveted to the disc part 802 in the radial outer area.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequences of process steps insofar as these refer to manufacturing, testing and work processes.

What is claimed is:

1. A torsional vibration damper for absorbing and compensating rotary shocks and torque fluctuations of an internal combustion engine, comprising an input disc part adapted for connection to the internal combustion engine and an output disc part adapted for connection to a driven unit, and at least one energy accumulator interposed between the disc parts and acting in a circumferential direction; said input disc part having first biasing means, said output disc part having second biasing means, and said first and second disc parts being rotatable relative to each other against the action of the energy accumulator; and further comprising a suspension device that houses the at least one energy accumulator and is divided into a first socket part and a second socket part, the socket parts being rotatable in relation to each other as well as in relation to the input disc part and the output disc part; wherein for a first sense of relative rotation between the input and output disc parts, the first biasing means engage the first socket part and the second biasing means engage the second socket part; and for a second sense of relative rotation, opposite to the first sense, between the input and output disc parts, the first biasing means engage the second socket part and the second biasing means engage the first socket part; and for either sense of relative rotation between the input and output disc parts, said engagements between biasing means and socket parts are form-locking engagements free of frictional engagement; so that for either sense of relative rotation between the input and output disc parts, the at least one energy accumulator is biased in a compressive sense between both of the socket parts.

2. The torsional vibration damper according to claim 1, wherein the first socket part and the second socket part are identical.

3. The torsional vibration damper according to claim 1, comprising flywheel masses connected to the input disc part and the output disc part.

4. The torsional vibration damper according to claim 3, wherein one of the flywheel masses comprises a slip clutch allowing a restricted range of angular displacement of said one of said flywheel masses relative to the disc part to which said one of said flywheel masses is connected.

5. The torsional vibration damper according to claim 4, wherein said one of said flywheel masses has circumferentially spaced recesses and the disc part connected to said one of said flywheel masses has stops complementary to and engaged in said recesses, whereby said restriction of the angular range of displacement is effected.

6. The torsional vibration damper according to claim 1, comprising a plurality of energy accumulators, wherein each of the first socket part and the second socket part comprises sockets arranged along a circumference, each socket part containing as many sockets as there are energy accumulators, wherein each socket is as wide as the suspension device in an axial direction of the torsional vibration damper, and wherein further each socket of the first socket part engages an opening of the second socket part and vice versa.

7. The torsional vibration damper according to claim 6, wherein sockets have receiving faces and the energy accumulators have cross-sectional areas, and wherein further the receiving faces are at least 70% as large as the cross-sectional areas.

8. The torsional vibration damper according to claim 7, wherein the energy accumulators have end faces that are complementary to the receiving faces.

9. The torsional vibration damper according to claim 7, wherein the socket parts have axially aligned cylindrical openings engaged by the biasing means, each of the openings being defined by a half-shell formed on one of the sockets, on a side of the one socket facing in an opposite direction from the receiving face of the one socket.

10. The torsional vibration damper according to claim 6, wherein each of the socket parts has a ring-shaped outer support located on an outer circumference and a ring-shaped inner support located on an inner circumference, the outer and inner supports of each socket part being coplanar and corresponding to approximately half the axial width of the suspension device, the sockets being housed radially between the inner and outer supports.

11. The torsional vibration damper according to claim 10, wherein the inner supports comprise support surfaces conforming to the at least one energy accumulator and serving to constrain the at least one energy accumulator against movement in an inward radial direction.

12. The torsional vibration damper according to claim 6, wherein the socket parts have a limited range of mobility relative to the biasing means of the input disc part and relative to the biasing means of the output disc part in a circumferential direction of the torsional vibration damper.

13. The torsional vibration damper according to claim 12, wherein the range of mobility is limited by stops provided on the sockets at outer circumferences of the socket parts.

14. The torsional vibration damper according to claim 12, wherein the socket parts comprise pockets for suspension of the at least one energy accumulator, and the stops extend circumferentially at both sides of the sockets into the pockets, thereby serving to constrain the at least one energy accumulator against movement in an outward radial direction.

15. The torsional vibration damper according to claim 1, wherein the at least one energy accumulator comprises at least one coil compression spring.

16. The torsional vibration damper according to claim 15, wherein the at least one coil compression spring has windings of a first diameter alternating with separate windings of a second diameter, starting and ending with windings of the first diameter, the first diameter being larger than the second diameter, the windings of the second diameter have a second center-point axis offset from and parallel to a first center-point axis of the windings of the first diameter, so that in a cross-sectional plane defined by the center-point axes, the windings of the first and second diameters are substantially aligned with each other on one side of the at least one coil compression spring while on a diametrically opposite side, the windings of the second diameter are located radially inside the windings of the first diameter, and the at least one coil compression spring is installed in the torsional vibration damper in an orientation where said diametrically opposite side faces in a radially outward direction of the torsional vibration damper.

17. The torsional vibration damper according to claim 1, wherein the socket parts comprise at least one of the materials from the group consisting of metals and plastics.

18. The torsional vibration damper according to claim 1, wherein the socket parts are made by an injection molding process.

19. The torsional vibration damper according to claim 1, further comprising circumferentially distributed screws through which the input disc part is connected to a drive shaft of the internal combustion engine, wherein the suspension device is mounted radially outside of the screws.

20. The torsional vibration damper according to claim 19, wherein the suspension device immediately adjoins the screws.

21. The torsional vibration damper according to claim 1, wherein each socket part comprises a circumferential reinforcement along its radially outer circumference.

22. The torsional vibration damper according to claim 21, wherein the reinforcements comprise closed wire rings.

23. The torsional vibration damper according to claim 1, wherein the suspension device comprises a circumferential reinforcement that surrounds both socket parts.

24. The torsional vibration damper according to claim 1, further comprising a friction generating device, wherein the input disc part and the output disc part are rotable relative to each other within a range of angular displacement and the friction generating device is active within said range of angular displacement.

25. The torsional vibration damper according to claim 24, wherein the friction generating device comprises a device for generating a base amount of friction and a device for generating a controlled amount of friction.

26. The torsional vibration damper according to claim 25, wherein the device for generating the controlled amount of friction comprises a friction disc and a friction regulating disc, the friction regulating disc serving to control the amount of friction produced by the friction disc.

27. The torsional vibration damper according to claim 26, wherein the friction regulating disc is coupled to one of the input disc part and the output disc part with angular play, whereby an onset of friction is delayed.

28. The torsional vibration damper according to claim 26, wherein the friction regulating disc is coupled to the input disc part.

29. The torsional vibration damper according to claim 26, wherein the output disc part comprises circumferentially distributed studs directed axially towards the input disc part, and wherein further the friction disc is suspended from said studs.

30. The torsional vibration damper according to claim 25, wherein the device for generating the controlled amount of friction comprises a friction regulating disc adapted to control as well as produce the controlled amount of friction.

31. The torsional vibration damper according to claim 24, wherein the friction generating device is mounted radially outward of the socket parts.

32. The torsional vibration damper according to claim 24, wherein the friction generating device is mounted radially inward of the socket parts.

33. The torsional vibration damper according to claim 24, wherein the friction generating device generates an amount of friction that is dependent on an amount of reactive force stored in the at least one energy accumulator.

34. The torsional vibration damper according to claim 33, wherein the socket parts have ramps cooperating with the biasing means to produce a relative axial displacement in response to a relative angular displacement, so that a friction disc which adjoins one disc part is compressed between said adjoining disc part and the suspension device to a degree that depends on the amount of force stored in the at least one energy accumulator.

35. The torsional vibration damper according to claim 1, further comprising at least one additional suspension device housing at least one additional energy accumulator, wherein the suspension device and the at least one additional suspension device are mounted at different radial locations of the torsional vibration damper.

36. The torsional vibration damper according to claim 35, wherein the suspension device and the at least one additional suspension device form an at least two-stage damping device.

37. The torsional vibration damper according to claim 1, further comprising a second damping device having arcuate springs, wherein the suspension device housing the at least one energy accumulator constitutes a first damping device mounted radially inside the second damping device, and wherein further the first and second damping devices form a combination.

38. The torsional vibration damper according to claim 37, wherein the combination is a series combination of the first and second damping devices.

* * * * *